Patented Nov. 19, 1935

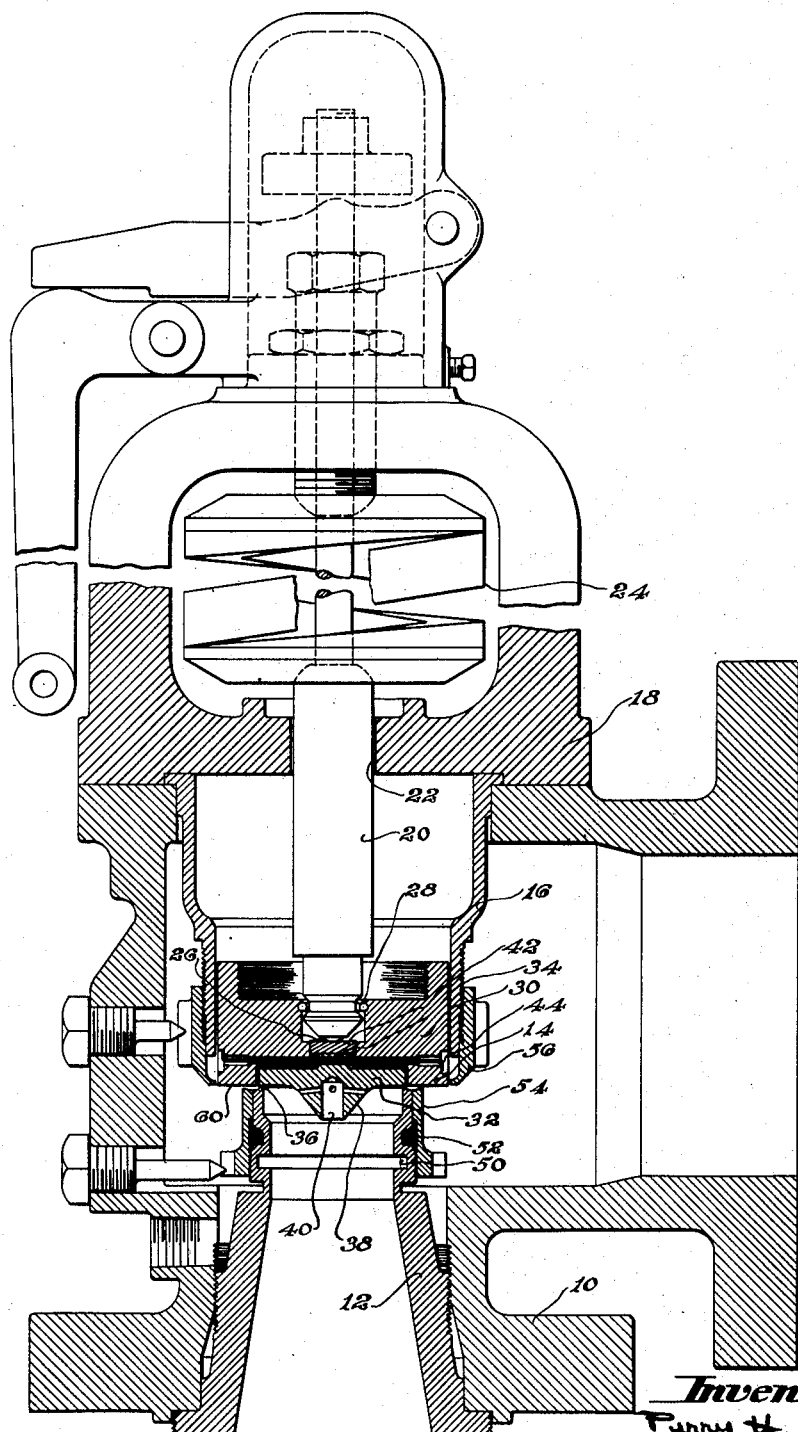

2,021,773

UNITED STATES PATENT OFFICE 2,021,773

RELIEF VALVE

Perry H. Gentzel, Newton, Mass., assignor to Crosby Steam Gage & Valve Co., Boston, Mass., a corporation of Massachusetts Application June 20, 1932, Serial No. 618,108

3 Claims. (Cl. 137—53)

The present invention relates to safety valves for steam lines and the like, and is particularly well adapted for use with steam lines where high pressures and temperatures are encountered, for example, steam pressures on the order of 400 lbs. or greater.

In safety valves of this character frequently employed for venting main steam lines having pressures as high as 1200 lbs. per square inch or more, it is of the utmost importance that the valve shall be capable of opening upon the occurrence of pressures above the normal working pressure within the line, and that upon restoration of such pressure to within the normal working range the valve shall close tightly without subsequent or continued steam leakage. The production of a valve which is capable of maintaining a tightly closed orifice against the pressures encountered and which shall at the same time afford the requisite high lifting capacity is not a simple problem, especially as it has been determined that slight leakage of steam between the contacting surfaces of the valve and seat quickly scores the seat, which in turn causes greater leakage, the situation becoming progressively worse as the valve continues in use.

It is the object of the present invention to so design safety valves of this character that a tight seat may be maintained under the highest pressures which may be encountered, with an accompanying capacity for high lifting of the relief valve upon the occurrence of pressures above normal.

With this and other objects in view, the various features of the invention consist in certain novel features of construction, combinations and arrangements of parts hereinafter described and claimed, the advantages of which will be obvious to those skilled in the art from the following description.

The accompanying drawing illustrates a section in elevation of a valve embodying the preferred form of the invention.

In the illustrated embodiment of the invention the valve casing is indicated at 10, and is provided with a separate throat tube 12 extending upwardly and forming a complete throat passage. The throat tube is provided at its exit end with a circular valve seat 36 of small contact area and may preferably be made of austenitic steel for a purpose to be presently described. The disk valve assembly is indicated at 14, and slides within a guide 16 secured within the upper portion of the body 10 through a bonnet 18. The disk assembly is provided with a stem 20 sliding within the bonnet at 22, and is normally held upon the seat by a spring 24, all as will be generally familiar to those skilled in the art. The connection between the stem and disk assembly is virtually a point bearing at 26 held in operative relationship by a snap ring 28.

According to the present invention a tight hermetically sealed closure is initially provided between the valve disk and the cooperating seat formed about the edge of the throat tube, and due to the novel features of the design, this tight seal may be maintained indefinitely regardless of steam temperatures and pressures which may be encountered. This I accomplish by a careful fitting and finishing of the contacting surfaces of the disk and seal seat, and thereafter avoiding relative creep or movement of the two surfaces with respect to one another, regardless of changes in temperature. I have found that by making the disk assembly in two parts with an outer and recessed holder 30 within which is supported and enclosed what might be termed a disk 32 with the bearing for the disk localized at 34, I am enabled to confine the expansive movement of the disk 32 to a movement comparable to the similar expansive movement of the seat, and cause the two movements due to changes of temperature to take place simultaneously and concurrently, thus avoiding any relative movement of the two surfaces with relation to one another, which would cause an abrasion or rubbing or scoring of the contacting surfaces with consequent leakage. Such a leakage which will otherwise occur incidentally causes erosion of the contacting surfaces with premature failure of the valve, and a condition which becomes progressively worse as the use continues.

Referring particularly to the drawing, the disk 32 formed of the same material as the throat tube 12, that is, austenitic steel, is of sufficient cross-section to avoid warping or distortion under the high temperatures employed, and maintains a true and accurate seat throughout the limited valve seat area indicated at 36. The conical projection 38 which affords the desired form of cross-section to avoid distortion and provide streamline flow may be drilled or counter-bored at 40 to provide for the passage of steam therethrough, and a distribution of heat which insures changes in temperature of the conical disk concurrently with similar changes in temperature of the throat tube, with a consequent equality of expansion of the two members. The disk bears throughout a localized area 34 upon the thrust block 42. The disk may be held in place by an elongated pin 44 passing therethrough as indicated. With this construction the disk virtually has a bearing which permits universal movement and consequent alignment with the seating surfaces. Sufficient clearance is introduced between the disk and surrounding holder to permit a relative expansion of the disk with respect to the holder and insure that the disk shall not come in contact with the adjacent surfaces of the holder independently of variations in temperature.

From the foregoing and by reference to the drawing, it will be noted that the disk is virtually enclosed within the recessed holder except for the surface in contact with the steam in the throat when the valve is closed and the disk is in contact with the seat. This virtually complete closure is accomplished by having the recess in the holder approximate the diameter of the seat and results in comparable expansive and contractive movements of the contacting disk and seat, both of which are governed by the temperature of the fluid in the throat.

I may find it desirable also to slot the throat tube generally as indicated at 50 and 52, to provide a substantially uniform cross-section and thus insure against distortion or sagging of the seat under the excessively high temperatures employed as might otherwise be the case.

The pressures at which the valve lifts, together with the drop in pressure necessary to close the valve after blow-down, are regulated through the adjustable nozzle ring 54 and the guide ring 56. In addition, it will be observed from the drawing that the area of contact between the valve and seat is a relatively narrow flat circumferential ring surrounded by a downwardly inclined surface upon the end of the throat tube. In addition, the adjoining surface of the nozzle ring is slightly inclined upwardly for the purpose of diverting the out-flowing steam upon initial lifting of the disk against the surface 60 of the surrounding holder, and thus augmenting the lift of the valve through the velocity head of the escaping steam. As the lift of the valve increases, the escaping steam encounters the downwardly projecting guide ring 56 and its direction is turned or partially reversed in a manner obvious to those skilled in the art, to further augment or increase the lifting force on the valve.

From the foregoing description it will be evident that I have designed a valve which provides the necessary high lift and low blow-down, with a freedom from incipient leakage not possible with constructions heretofore designed. As previously pointed out, the capacity for hermetic sealing of the surfaces with the valve closed for indefinite periods is of greatest importance, as otherwise such a leakage provides its own channel of progressively greater amount, and presumably causes premature failure of the valve through what is commonly known as wire drawing of the seat or opposing face of the disk. No valve of this type can be successfully employed on high pressure steam service without more or less frequent servicing unless leakage sufficient to cause wire drawing is eliminated and avoided.

Although the present valve is illustrated as using austenitic steel in connection with the throat tube and cooperating conical disk, it should be understood that the features of the invention are not confined to the use of such material. The contemplation of a separate and enclosed disk member in immediate contact with the cooperating seat with proper structural provision for insuring that expansion and contraction of the member shall be virtually concurrent and of equal extent with that of the seat, insures against rubbing and abrasion, regardless of the materials which may be used. With this factor properly accounted for, materials satisfactory in performance under the high temperatures employed may well afford the desired results. It will be understood that, although particularly described in connection with the relief of steam, the present invention is well applicable to other fluids where high temperature conditions make is desirable.

What is claimed is:—

1. A loaded relief valve for high temperature service comprising a valve casing, a separate throat tube provided at its exit end with a circular valve seat of small contact area, the valve seat circumscribing the oríficial opening in the tube, a valve holder positioned above the valve seat and projecting therebeyond, a recess in the holder approximating the diameter of the seat, a separate and independent valve disk having clearance within the recess sufficient to permit expansion of the disk independently of the holder under the influence of wide temperature variations, and means for connecting the disk centrally with the holder to permit swivelling movements as well as expansive and contractive movements of the disk within the recess, the disk having an outer diameter approximating that of the valve seat and when engaged with the seat being completely enclosed except for the surface in contact with the fluid in the throat tube to insure that the disk and valve seat forming a part of the throat tube shall both be governed in their expansion and contraction by virtually the same temperature conditions created by the heated fluid in the throat tube, and causing equal and like expansion and contraction of the disk and seat.

2. A loaded relief valve for high temperature service comprising a valve casing, a separate throat tube forming a complete throat passage and provided at its exit end with a circular valve seat of small contact area, the valve seat circumscribing the oríficial opening in the tube, a circular valve holder positioned above the valve seat and projecting therebeyond, a recess in the holder approximating the diameter of the seat, a separate and independent valve disk having clearance within the recess sufficient to permit expansion of the disk independently of the holder under the influence of wide temperature variations, and means for connecting the disk centrally with the holder to permit swivelling movements as well as expansive and contractive movements of the disk within the recess, the disk when engaged with the seat being completely enclosed except for the surface in contact with the fluid in the throat tube to insure that the disk and seat forming a part of the throat tube shall both be governed by temperature conditions created by the fluid within the throat tube to cause equal and like expansion and contraction of the disk and seat, a circular guide surrounding the holder and within which the latter is slidingly received, and means for centrally applying loading pressure to the holder from above.

3. A loaded relief valve for high temperature service comprising a valve casing, a separate throat tube provided at its exit end with a circular valve seat of small contact area, the valve seat circumscribing the oríficial opening in the tube, a valve holder positioned above the valve seat and projecting therebeyond, a recess in the holder approximating the diameter of the seat, a separate and independent valve disk having clearance within the recess sufficient to permit expansion of the disk independently of the holder under the influence of wide temperature variations, the disk having a conical and downwardly projecting central portion, and means for connecting the disk centrally with the holder to permit swivelling movements as well as expansive and contractive movements of the disk within the recess, the disk having a diameter approximating that of the valve seat and when engaged with the seat being completely enclosed except for the surface in contact with the fluid in the throat tube to insure that the disk and seat forming a part of the throat tube shall both be governed by temperature conditions created by the fluid in the throat tube and cause equal and like expansion and contraction of the disk and seat.

PERRY H. GENTZEL.